United States Patent
Spearman et al.

(10) Patent No.: US 7,035,281 B1
(45) Date of Patent: Apr. 25, 2006

(54) WIRELESS PROVISIONING DEVICE

(75) Inventors: Anthony C. Spearman, Lane, SC (US); Andrew E. Tompkins, Summerville, SC (US)

(73) Assignee: WP Media, Inc., Kingstree, SC (US)

( * ) Notice: Subject to any disclaimer, the term of this patent is extended or adjusted under 35 U.S.C. 154(b) by 489 days.

(21) Appl. No.: 09/660,709

(22) Filed: Sep. 13, 2000

(51) Int. Cl.
*H04J 3/16* (2006.01)
*H04L 12/56* (2006.01)

(52) U.S. Cl. ........................................ 370/465; 370/401
(58) Field of Classification Search ................. 370/351, 370/352, 392, 396, 401, 404, 465, 328, 329, 370/338; 455/410, 411, 432; 713/200, 201
See application file for complete search history.

(56) References Cited

U.S. PATENT DOCUMENTS

| | | | | |
|---|---|---|---|---|
| 5,572,528 A | * | 11/1996 | Shuen | 370/85.13 |
| 5,655,148 A | * | 8/1997 | Richman et al. | 395/828 |
| 5,745,884 A | * | 4/1998 | Carnegie et al. | 705/34 |
| 5,796,832 A | * | 8/1998 | Kawan | 705/65 |
| 5,960,074 A | * | 9/1999 | Clark | 379/310 |
| 6,003,100 A | * | 12/1999 | Lee | 710/102 |
| 6,023,563 A | | 2/2000 | Shani | |
| 6,044,062 A | | 3/2000 | Brownrigg et al. | 370/238 |
| 6,058,431 A | | 5/2000 | Srisuresh et al. | |
| 6,212,613 B1 | | 4/2001 | Belair | 711/207 |
| 6,249,516 B1 | | 6/2001 | Brownrigg et al. | 370/338 |
| 6,272,129 B1 | * | 8/2001 | Dynarski et al. | 370/356 |
| 6,275,693 B1 | * | 8/2001 | Lin et al. | 455/414 |
| 6,292,833 B1 | * | 9/2001 | Liao et al. | 709/229 |
| 6,295,197 B1 | * | 9/2001 | Watts et al. | 361/683 |
| 6,311,042 B1 | * | 10/2001 | DeSchrijver | 455/66 |
| 6,317,831 B1 | * | 11/2001 | King | 713/171 |
| 6,453,371 B1 | * | 9/2002 | Hampson et al. | 710/37 |
| 6,549,773 B1 | * | 4/2003 | Linden et al. | 455/426.1 |
| 6,629,111 B1 | | 9/2003 | Stine et al. | 707/205 |
| 6,708,330 B1 | | 3/2004 | Moberg et al. | 717/158 |

* cited by examiner

*Primary Examiner*—Man U. Phan
*Assistant Examiner*—Toan D. Nguyen
(74) *Attorney, Agent, or Firm*—Technology Legal Counsel LLC

(57) ABSTRACT

A wireless provisioning device (WPD) is a computer data traffic management system capable of routing TCP/IP traffic using 2.4 Ghz equipment. This WPD is to be strategically placed in logical segment regions within a wireless network to facilitate data traffic management. This device acts to provide connectivity between wireless backbone access points. The device may also be located within customer local area network (LAN) while providing connectivity to a wide area network (WAN). The wireless device has seven total wireless segments. The wireless device is capable of filtering IP addresses, controlling firewall and/or router and/or bridge. The wireless provisioning device increases effective throughput of TCP/IP traffic over the WAN or LAN while providing for secure management and greater connectivity.

32 Claims, 3 Drawing Sheets

Wireless Provisioning Router Implementation

WIRELESS PROVISIONING DEVICE

FIELD OF THE INVENTION

The present invention relates to telecommunications gear, and more specifically, in the preferred form, to wireless provisioning devices capable of routing TCP/IP traffic using 2.4 Ghz equipment.

BACKGROUND OF THE INVENTION

Until recently, Internet connectivity was restricted to hard-wired connections to the Internet cloud. With the advent of stronger 2.4 Ghz antennae it became more practical to administer wireless connections to computers that would eventually connect back to the Internet cloud. As the speed of the wireless equipment increased, it became more cost effective to provide wireless connections to the user than cabling. As a result, attempts were made to replace wired Wide-area networks (WANs) with high-speed wireless connections.

Presently, wireless equipment only offers bridging solutions. These wireless bridges contain either one or two wireless cards, depending on manufacturer, and one wired connection. In some cases there are two wireless cards and one wired connection. However, in this rapidly expanding telecommunications landscape, it may prove necessary to have 3 or 4 wireless connections and 3 or 4 wired connections. Although a bridge is a good way to connect two or three Local-area networks (LANs) together, the overhead of bridging will not function for an extensive WAN because current routing logic has a theoretical breakdown at 3 to 5 bridges. As a result, present day 2.4 Ghz wireless connection points provide bridging solutions that greatly restrict the ability of the user to place wireless equipment in a wide area network. 2.4 Ghz wireless equipment is designed to create hubbed LANs and to bridge together two or more small LANs. It was not designed to work in a public domain WAN environment.

Additionally, current wireless connections were designed for indoor use and security is only associated with the network name. Alternatively, the system may be held closed through the use of Media access control (MAC) addressing. Despite the wireless function, such LAN solutions assumed that the connections back to the wireless access point were relatively few in number and that the connections were somewhat stationary. As a result, the MAC filtering is housed resident on the access connection point. The connection point typically requires rebooting before the new access list may take effect. In addition, there are a finite number of MAC addresses that may be placed on the connection point. This effectively limits the number of roaming customers that may be added to the system. Each time a new member is added, every connection point in the network must be updated and rebooted.

In order to manage a wireless connection point, Simple Network Management Protocol (SNMP) became the standard method for data transfer. To modify the MAC filter, the administrative password for the access connection point is passed along the network. This password is passed in clear text. Without secure shell connections this clear text message becomes easy to intercept for anyone connected to the WAN. Once the administrative password is breached the whole system becomes compromised. Earlier systems prevented this by providing only those within the organization the network name. Without the network name, wireless cards will not connect with the connection point. In a public domain environment the network name will be common to all those that use the service, which makes unauthorized access relatively simple.

There is a need for a piece of wireless equipment that can be used to effectively connect a large WAN. There is also an existing need for a wireless provisioning device that provides network routing at the source and security measures through the network. There is an additional need for 2.4 Ghz wireless connection points that provide bridging solutions that afford the user the ability to place wireless equipment in a wide area network. There is yet another existing need for wireless connections designed for outdoor use and flexible security. Additionally, there remains a need for a system that can accommodate multiple connections back to the wireless access point without requiring rebooting before the new roaming members can be added to the system.

SUMMARY OF THE INVENTION

The present invention provides a wireless provisioning device capable of routing TCP/IP traffic using 2.4 Ghz equipment. This device is to be strategically placed in logical segment regions within a wireless network to facilitate data traffic management. This device acts to provide connectivity between wireless backbone access points. The device may also be located within customer LANs while providing connectivity to a WAN. In a preferred embodiment, the wireless device has seven total wireless segments. The wireless device is capable of filtering IP addresses, controlling firewall and/or router and/or bridge needs and increases effective throughput of TCP/IP traffic over the WAN or LAN while providing for secure management and greater connectivity.

It is a primary objective of the present invention to provide a piece of wireless equipment that can be us ed to effectively connect a large WAN.

It is another objective of the present invention to provide a wireless provisioning device that provides network routing at the source and security measures through the network. The solution is to provide secure connections between wireless access points and to points that require administrative connections.

Yet another objective of the present invention is to provide 2.4 Ghz wireless connection points that provide bridging solutions that afford the user the ability to place wireless equipment in a WAN.

Still another objective of the present invention is to provide wireless connections designed for outdoor use and flexible security. The present invention achieves the above objective through each of several embodiments, particularly, by radius authentication. Radius authentication is a more universal, more flexible and more secure method of authentication. The authentication process is done with secure connections to a central server. If for some reason security is breached then the username and password can be changed on the server side through a database change as opposed to a hardware change. By incorporating a new operating system with the use of the present wireless cards, wireless devices can be configured for logical management through secure connections. Furthermore, radius authentication can pass securely through the wireless device into the secure network.

An additional objective of the present invention is to provide a system that can accommodate multiple connections back to the wireless access point without requiring rebooting before the new roaming members can be added to the system.

In accomplishing these and other objectives, there has been provided, in accordance with one aspect of the present invention, a wireless provisioning device that can route at the node providing for lower network overhead and stabilizing the network into a durable redundant WAN.

Further objects, features and advantages of the invention will be apparent from the following detailed description taken in conjunction with the accompanying drawings.

DETAILED DESCRIPTION OF THE INVENTION

Figure 1:
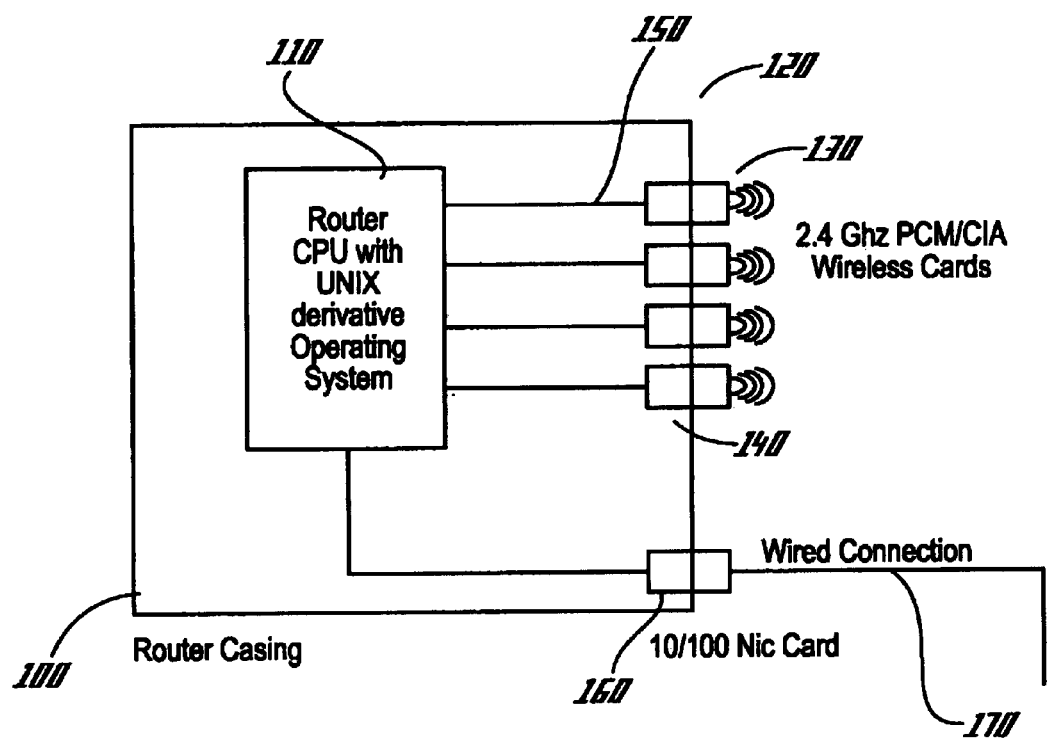
FIG. 1 is a schematic diagram of a wireless provisioning device in accordance with the present invention.

The Provisioning device system, in accordance with the present invention comprise a plurality of wireless access points; a wireless provisioning device for receiving, transmitting, and directing data over a plurality of networks and capable of sustaining connectivity between the wireless access points and the wireless provisioning device, the wireless provisioning device comprising a chassis, at lease one network card, at least one wireless card, at least one processor, and at least one operating system operable configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new roaming member can be added to the system; a carrier structure communicably positioned between the wireless provisioning device and the plurality of wireless access points for transmitting and receiving data between the wireless provisioning device and the plurality of wireless access points by means of a secure connection; and a security authentication protocol capable of authenticating traffic as it passes through the carrier structure.

The following terms are used in this application:

Access Point: On a network, a device designed to allow computers that are not part of a network to connect to and communicate with the network. The primary function of an access point is to provide a point of access for those unconnected computers.

Authentication: A system of measures for keeping information on a system safe from corruption or prying eyes. In networks, the procedure by which a computer verifies user identification. The most common form involves the comparison of a logon name and password to a stored file of approved user names and passwords. Any differences between the two will prohibit the user from accessing the information.

Bridge: Links networks so that data from one network can pass through another network on its way to still another network.

Datagram: A single unit of data, including its destination information, which is transmitted through a network.

Directory Service Member: A network management system, located on one enterprise capable computer. This computer maintains a database directory that stores all information from billing to authentication privileges for those on the network. Specifically this machine records MAC addresses and billing profiles for those in the system. This computer is a central repository that controls users access, system privileges and payment status.

Dynamic Host Configuration Protocol (DHCP): An Internet protocol for automating the configuration of computers that use TCP/IP. DHCP can be used to automatically assign IP addresses, to deliver TCP/IP stock configuration parameters, and provide other information such as the addresses for auxiliary servers.

Gateway: A complex internetworking device that converts information from one protocol to another. Gateways transfer information between networks that use different communications protocols. The gateway actually tears down the information from one service and restructures it in the other network's protocol format. Gateways include all hardware and software used to link dissimilar network operating systems (NOS) or to link local-area networks (LANs) to mainframes or wide-area networks (WANs). Gateways also are used in electronic mail (E-mail) to convert messages between services using different E-mail protocols.

Graphical User Interface (GUI): A GUI uses graphical symbols, called icons, and menu to carry out commands.

Local-Area Network (LAN): A group of computers, usually in one building or office, physically connected in a manner that lets them communicate and interact with each other. For a network to operate, it needs a server, which is a computer that holds data used by the different computers on the network. Some of the benefits of a network connection include the ability to share document files and expensive equipment. Networks can be connected using different combinations of topologies, protocols, software and hardware. A network that uses radio transmissions instead of cables to connect computers may be called a local-area wireless network.

Media Access Control (MAC): The protocol that determines the transmission of information on a network.

Node: Any device that can communicate with other computers in a group of interconnected computers. Usually, a node refers specifically to a computer system (CS) or terminal that is part of a network.

Packet: A block of data transmitted from one computer to another on a network or on the Internet. A packet contains three parts: the data to be transmitted, the data needed to guide the packet to its destination, and the data that corrects errors that occur along the way. Several packets make up a typical transmission. The computer splits up the transmission at the transmission point and reassembles it at the destination point.

Protocol: A set of rules and procedures for exchanging data between computers on a network or through the Internet. Protocol usually includes information or error checking, data compression, and sending and receiving messages.

Router: The part of a communications network that receives transmissions and forwards them to their destinations using the shortest route available. Data may travel through multiple routers on the way to its destination.

Simple Network Management Protocol (SNMP): It exchanges network information through messages technically known as protocol date units (PDUs).

Telnet: Terminal emulation in which a user is connected to a remote host using an Internet account as if the user were directly connected to the host, such that a connectivity session continues as if the user was at a terminal connected to the host, though the user is actually connected to another site, using the Internet to connect to the host.

Topology: The physical configuration of a network that determines how the network's computers are connected.

Transmission Control Protocol/Internet Protocol (TCP/IP): A language governing communication among all computers on the Internet. TCP/IP is two separate protocols, TCP and IP, that are used together. The Internet Protocol portion of the standard dictates how packets of information are sent out over networks. IP has a packet-addressing method that lets any computer on the Internet forward a packet to another computer that is a step or more closer to the packet's recipient. The Transmission Control Protocol ensures the reliability of data transmissions across Internet-connected networks. TCP checks packets for errors and submits requests for retransmission if errors are found; it also will return the multiple packets of a message into the proper, original sequence when the message reaches its destination. Wide-Area Network (WAN): A collection of computers connected or networked to each other over a geographic area. WANs usually require special arrangements with telephone companies because data is transmitted among locations (called sites) across telephone lines.

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the term "wide area network" is used, but the distinction is one of degree and the definitions sometime overlap.

A bridge is a device that is connected to at least two LANs and serves to pass message frames or packets between LANs, such that a source station on one LAN can transmit data to a destination station on another LAN, without concern for the location of the destination. Bridges are useful network components, principally because the total number of stations on a single LAN is limited. Bridges can be implemented to operate at a selected layer of protocol of the network.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring reliable data delivery.

A model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets and attaching control information to the packets.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a MAC sublayer. This sublayer determines which station should get access to the communication channel when there are conflicting requests for access. The functions of the MAC layer are more likely to be dependent on the nature of the transmission medium.

The basic function of a bridge is to listen "promiscuously," i.e., to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

Internet is a collection of networks, including Arpanet, NSFnet, regional networks, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message. TCP/IP frequently uses a slight deviation from the seven-layer OSI model in that it may have fewer layers. The seven layers are as follows:

Layer 7—The Application Layer. Identifies communications partners, user security, and authentication, as well as specific details about syntax of a transmission. Examples of Layer 7 protocols are File Transfer Protocol (FTP), Simple Mail Transfer Protocol (SMTP) and telnet.

Layer 6—The Presentation Layer. Governs the translation of a transmission from data to text, depending on the software application in use. Control is generally vested in the operating system that deals with specific aspects of data through protocols such as Moving Pictures Experts Group (MPEG) and Joint Photographic Experts Group).

Layer 5—The Session Layer. Establishes communications between parties to both ends of a session, then terminates them when transmission is complete, via protocols such as AppleTalk and Session Control Protocol (SCP).

Layer 4—The Transport Layer. In this layer, Transmission Control Protocol (TCP) and Name Binding Protocol (NBP) add transport data to the packet and pass it to layer 3.

Layer 3—The Network/Internet Layer. When an action is initiated on a local host (or initiating host) that is to be performed or responded to on a remote host (or receiving host), this layer takes the package from layer 4 and adds IP information before passing it to layer 2. By way of protocols such as Border Gateway Protocol (BGP) or Routing Information Protocol (RIP), identifies a transmission's intended recipient based on specific network protocols and controls the route each packet of data, in the complete transmission, takes on its journey.

Layer 2—The Data Link/Network Interface Layer. This is the network device as the host, or local computer, sees it and it is through this medium that the data is passed to layer 1. Adds, via protocols such as Logical Link Control (LLC) or Media Access Control (MAC), the specific code necessary to take packets of data on their way using information from layer 3. For example, if a network standard requires that each data packet begin with a string of specific binary digits, they are added at layer 2.

Layer 1—The Physical Layer. This is literally the Ethernet or Serial Line Interface Protocol (SLIP) itself. Defines the physical interface necessary to get communication information from point A to point B, and it includes various LAN and WAN specifications.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue. As a message is sent from the first host to the second, gateways pass the packet along by stripping off lower layers, readdressing the lower layer, and then passing the packet toward its final destination.

A router, like a bridge, is a device connected to two or more networks. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. Only the addressed destination host responds, and the router is then able to insert the correct data link layer address into the message being forwarded, and to transmit the message to its final destination.

IP routing specifies that IP datagrams travel through internetworks one step at a time based on the destination address in the IP header. The entire route is not known at the outset of the journey. Instead, at each stop, the next destination is calculated by matching the destination address within the datagram's IP header with an entry in the current node's routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the device to which the datagram should be sent next. This algorithm uses the information from the routing table entries, as well as any cached information local to the router. This new address is most likely the address of another router/gateway. If the datagram can be delivered directly, the new address will be the same as the destination address in the IP header.

The next address defined by the method above is not stored in the IP datagram. There is no reserved space to hold it and it is not "stored" at all. After executing the routing algorithm to define the next step address to the final destination. The IP protocol software passes the datagram and the next step address to the network interface software responsible for the physical network over which the datagram must now be sent.

The network interface software binds the next step address to a physical address, forms a packet using the physical address, places the datagram in the data portion of the packet, and sends the result out over the physical network interface through which the next step gateway is reached. The next gateway receives the datagram and the foregoing process is repeated. In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next step address. In the system and methodology of the present invention, the source address is tested to see in which ISP address range it falls. Once the ISP address range is determined the packet is then routed to the next step address associated with the specific ISP.

It must be noted, however, that routing wireless networks at connection nodes is the most efficient means of passing Internet data. One aspect of the present wireless provisioning device is to provide routing at each node connection point. This provides for a stronger network and provides flexibility in network design. This flexibility allows for better network traffic management and improves the overall bandwidth by reducing network latency through optimization of routes and data packet management. Although the wireless provisioning device is capable of bridging, it will be the determination of the network engineer to establish the wireless provisioning device as a bridge to the network or a router to the network. This feature gives the network engineer more flexibility to determine the network design. Furthermore, the flexible nature of the equipment allows the user to change a leaf node that bridges into a major backbone node that routes through the use of code modification without the need to reboot.

Subsequently, as a node begins to grow, the network engineer can upgrade that node to fit the needs of the network without harming existing customers. By inserting the cards in the slots of a chassis that contains open-source code, preferably LINUX, as its operating system (OS), the wireless provisioning device can be configured as a router or a bridge. The routing module of LINUX is not a portion of the main operating kernel. Being a subcomponent of the OS, the routing module can be upgraded and modified without rebooting the system. A reboot of an advanced LINUX box may take up to 30 minutes to complete. The upgrade of a routing module in LINUX takes less than 2 seconds to reinitialize. This reinitialization is transparent to the customers attached to this box. The routing module is replaceable by a bridge module if routing is not necessary for the connection node. Routing at the connection point allows for the filtering of IP addresses for either all of the customers attached to that node or for an individual IP address attached to that node. Furthermore, the routing module contains routing logic capable of bandwidth shaping. This process only allows certain volumes of data to be transmitted to and/or from a certain customer IP address.

The present invention furthers the art with the addition of more access points. By providing a flexible configuration of preferably eight ports, the wireless provisioning device may contain up to seven wireless connections and one wired connection, or seven wired connections and one wireless connection, or any combination as seen fit for the network. This reduces overall cost and decreases space requirements. By placing this system on a faster chip set, the equipment effectively processes more data from the same point. Furthermore, this feature allows the expansion of the system to develop from an outlying leaf node with little usage to a major backbone node with multiple redundancy without affecting existing customers. The user can also increase the number of potential customers to the connection point in the network by adding cards and antennas without the need for chassis changes. Because the physical configuration of the system resides in the chassis of a personal computer with preferably eight possible network slots, the wireless provisioning device can be configured with differing numbers of wireless cards and network cards. The chassis may contain up to two processors. Running the LINUX operating system the single or dual processor configuration allows for hefty data management. This processor configuration and extensive amounts of random access memory allows the operating system to handle extensively more information than the traditional wireless connection points.

The provisioning device, in accordance with the present invention, also addresses the security of wireless equipment. Using a secure shell telnet connection to the wireless provisioning device, message traffic and administrative information cannot be sniffed by other users on the network. Due to this feature, public domain wireless equipment can be made available. This feature uses a more universal management scheme of telnet. Thus the administrator may write interface Graphical User Interfaces (GUIs) or can control the node through the use of a plain text command line screen. Connection to these nodes can be limited to authorized IP addresses and domain names, reducing the chances of unauthorized network entries. Presently, wireless equipment use Simple Network Management Protocol Version 1 (SNMPV-1) protocol for the management of the connection device. SNMPV-1 is limited to text message traffic. Any connection made to this connection point is on the same logical segment as those that are doing administrative work to the connection device. In every network solution logical segments contain all the information that is passed within that segment. Sniffing traffic on that logical segment has long been known to be a problem within networking circles. SNMPV-6 protocol is the typical solution to this problem while using SNMP protocol. However SNMPV-6 is a processor intense protocol providing for extensive network overhead. By using a secure telnet connection the network overhead is reduced while increasing the security of the system. A secure telnet connection only allows certain IPs to connect to certain dataports. This limited connection structure effectively creates different logical segments within the same physical network segment. The newly created logical segment prevents the sniffing of administrative traffic by the common user.

In a preferred embodiment of the present wireless provisioning device, limited static MAC addressing is replaced by or coupled with radius authentication. The radius authentication can be tied to the MAC addressing in conjunction with a user name and password. This method of authentication greatly reduces the chances of service theft and allows the user a mobile solution between cells. Furthermore this feature lends itself to a directory service method that will allow a more customized interface for the user. Using IP filtering, authorization levels and enterprise user management the wireless provision router with directory service will control bandwidth consumption, and provide a more custom service to the user. Without radius authentication, users are connected to the network without any control from a central server. By providing radius authentication one server controls the ability of the user to enter certain parts of the network.

The present invention, in multiple embodiments, provides firewall and proxy service. The wireless provisioning device can provide both of these services at the user's termination point. These services will provide an added layer of protection to the user without the need for security management. Furthermore the proxy nature will provide for IP translation and allow users to maintain networks behind the entry point to the net.

Wireless provisioning devices, in accordance with the present invention, provide connections from both single personal computer cards and from other wireless provisioning devices. Therefore the same wireless WAN may contain single users and large LANs. In conventional wireless equipment configurations, the user must choose to provide service to either the personal computer containing the cards or to a wireless connection bridge. Commercial users would then select to use a wireless connection bridge while a residential user would choose to use a personal computer. Without the wireless provisioning device, two separate wireless infrastructures would have to be erected to satisfy all types of customers. The wireless provisioning device allows the user to connect to the wireless infrastructure using either an individual personal computer or another wireless provisioning device. As a result, one wireless infrastructure may be erected while satisfying all potential customer types.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 3, is not intended to limit the scope of the invention, as claimed, but it is merely representative of the presently preferred embodiments of the invention.

Figure 2:
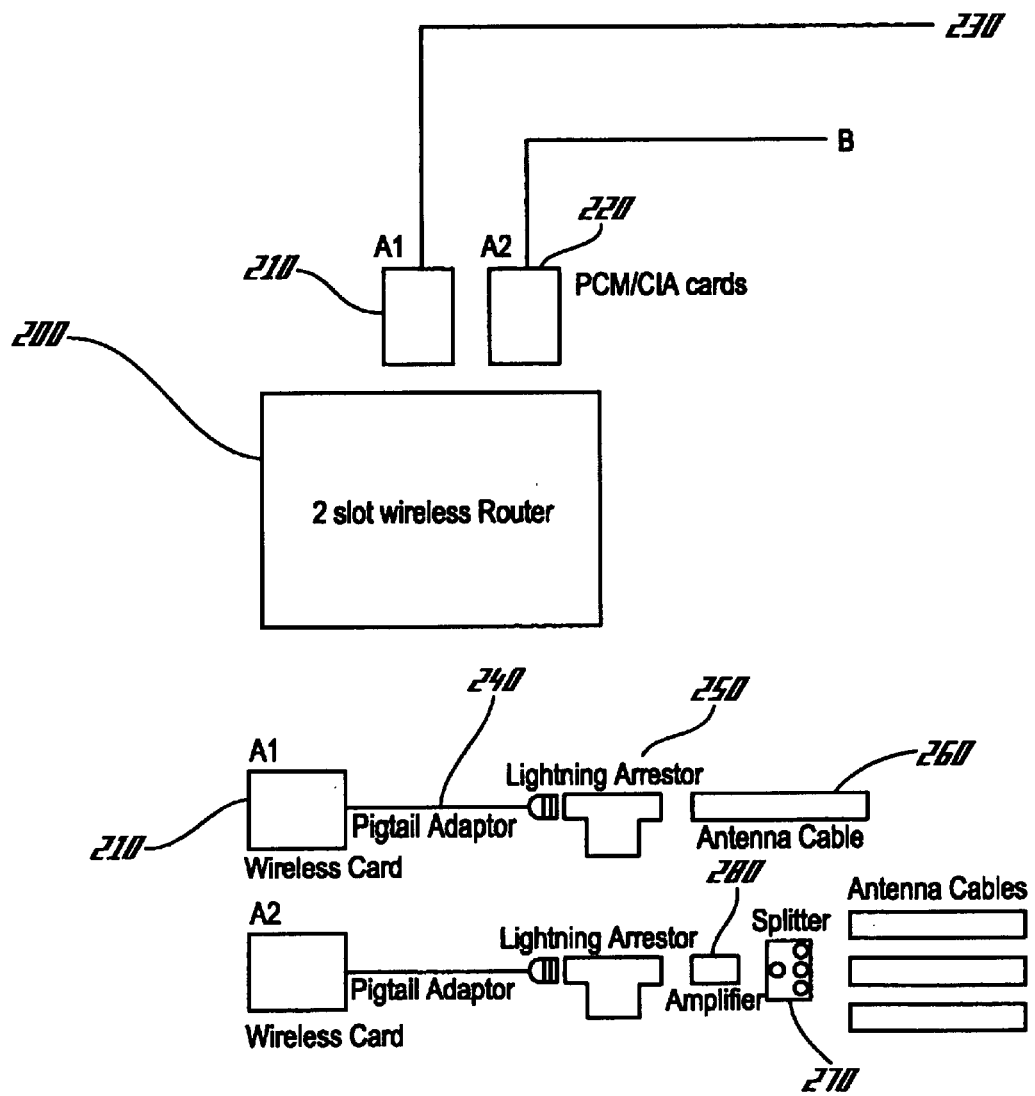
FIG. 2 is a schematic diagram of a two slot wireless device embodiment in accordance with the present invention.
Figure 3:
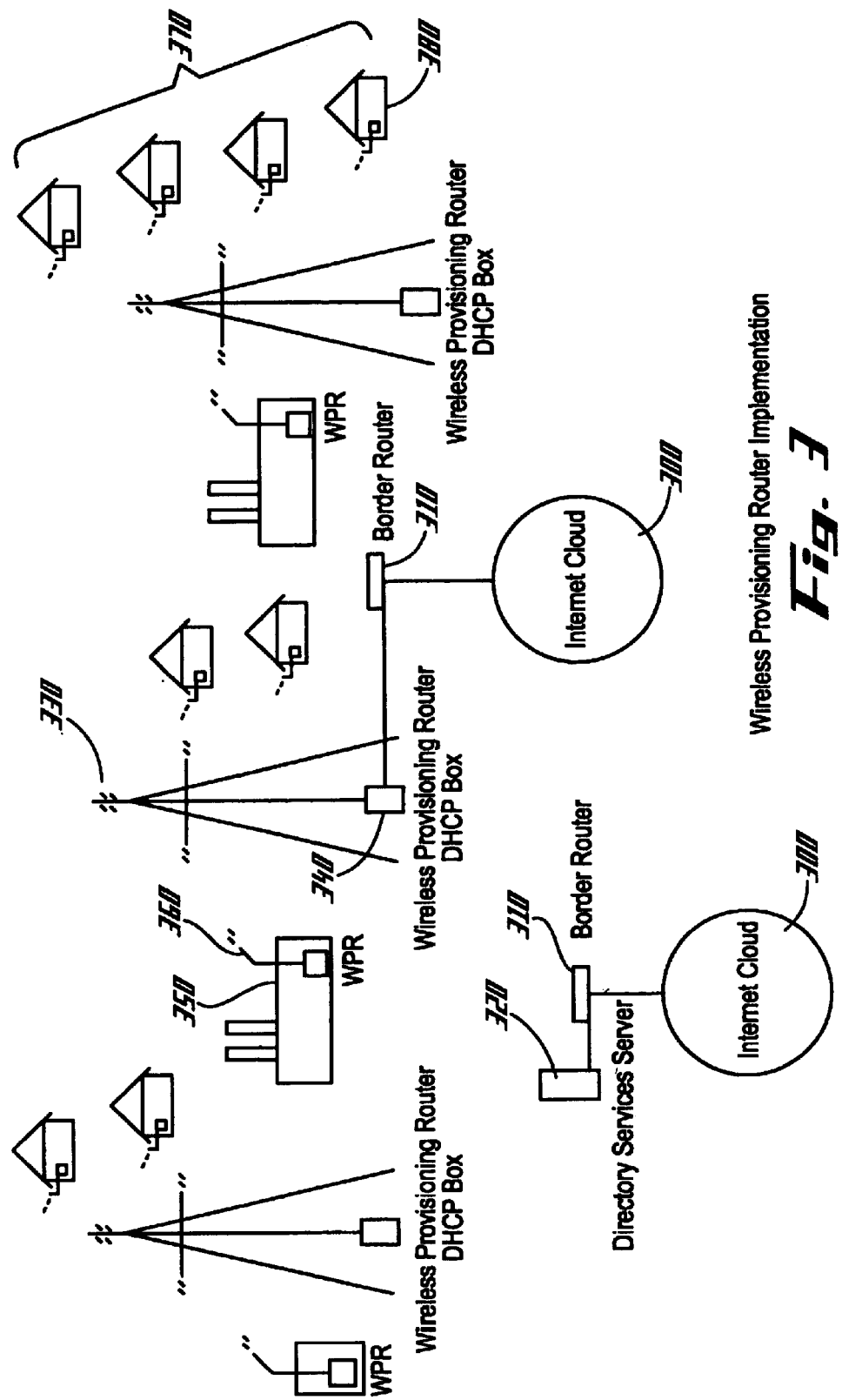
FIG. 3 is a schematic diagram of a wireless provisioning system in accordance with the present invention.

The presently preferred embodiments of the invention will be best understood by reference to the drawings of FIGS. 1–3, wherein like parts are designated by like numerals throughout.

In general terms, FIGS. 1–3 show a self-standing wireless system. Referring now to FIG. 3, connected to the wireless cloud 300 one readily notes a border router 310 at each connection point. In a preferred embodiment of the present invention, the border router 310 is a typical wired router. Connected to one layer of the cloud 300 is a directory services member 320. This device may be configured to control the objects to which all client side computers conduct authentication. The cloud 300 connected to the tower 330 passes through a wireless router 340. This router 340 serves as both a router and a Dynamic Host Configuration Protocol (DHCP) server. All further connections on the tower also use wireless routers to connect to the central wireless router.

Each time a wireless router 340 is located on a tower 330 that router acts as its own DHCP server. A predetermined set of IP addresses are assigned to that tower 330. All DHCP authentication returns to the Directory services member 320 to validate login. At large usage locations such as factories 350 a wireless router 340 is placed at the output connection point 360. This wireless router 340 serves as an internal router for all equipment within the facility and as a border router for the location. A wireless router 340 is only needed by those clients that have a large number of computers connected to the wireless network. Home users and small businesses 370 that have one or two PCs 380 that can connect directly back to the wireless router 340 on the tower 330. Furthermore, small computer users may bridge back to the tower 330 and then not get routed until they reach the border router 310 at the outlet to the Internet cloud 300.

Referring specifically to FIG. 1, an exemplary embodiment of a wireless provisioning device in accordance with the present invention may comprise a chassis 100 suitably configured with a UNIX based operating system 110 such as a LINUX operating system running on an Intel based CPU 120. The 2.4 Ghz wireless cards 130 are constructed with typical PCM/CIA connectors 140. That connector is adapted to the PC bus structure 150 through a PCM/CIA to PCI adapter. The bus interface to the PC is all PCI. Information enters and exits the wireless cards through the PCI bus into the TCP stack (not shown) of the LINUX OS 110. The TCP stack on the LINUX OS is configured in a manner to either redirect or transmit the data through the appropriate interface. In many cases data will enter into the wireless provision device through the 10/100 Network Interface Card (NIC) 160 through standard wired IP methods 170. Once the information enters through the wired connection 170 the TCP stack configuration in the LINUX stack module will direct the traffic out the appropriate connection. The LINUX TCP stack configuration optimizes the network data traffic flow.

Referring now, principally, to FIG. 2, a typical configuration for a 2.4 Ghz bridge 200 is either 1 or 2 wireless cards 210 with PCM/CIA connectors 220. These cards 210 connect to the bridge bus through the PCM/CIA connections 230. The output from the wireless bridge 200 is either the 10/100 ethernet or the other wireless card 210. The wireless cards 210 have an adapter 240 for increased antenna gain. These connectors go to a lightning arrestor device 250 to prevent damage from lightning strikes. These lightning arrestors 250 connect to special low loss antenna cables 260. The low loss antenna cables 260 then connect to increased gain antennae of varying global patterns and strength. In some events these antennae require splitters 270 and amplifiers 280 to optimize globe patterns for the area.

An apparatus and system according to the invention works well in a wide variety of cases and does not inhibit or impact future enhancements to network protocols and operating systems. To assure that operations at the application and transport levels do become aware of changes of address promptly, the apparatus and system may eliminate the prospect of a single point of failure, eliminate or reduce sub-optimal routing for all applications, provide improved security to protect communication over wireless media, and allow users to switch network adapter cards while preserving all connections, such as software applications and network administration, transparently to the user.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A wireless provisioning device for use in public domain networks wherein the wireless provisioning device is accessible by a user of mobile computing devices, comprising:

a chassis;

at least one network card;

at least one wireless card;

at least one processor;

an operating system, the operating system operably configured in the chassis to control the at least one, network card, the at least one wireless card and the at least one processor, which are operatively coupled with the chassis;

a packet-switched interface capable of receiving a multiplicity of inbound framed packet-data to provide inbound packets and transmitting a multiplicity of outbound framed packet-data comprising outbound packets;

a channeling controller, coupled to the packet-switched interface that channels the inbound packets based on the inbound address information and constructs the outbound packets and channels the outbound packets with the outbound address information, the channeling controller capable of being effectively connected to at least one network via the operating system; and an authenticator in operative communication with the operating system to allow authentication at the wireless provisioning device;

whereby the user of a mobile computing device connects to the wireless provisioning device without having to first access the Internet.

2. The wireless provisioning device of claim 1, wherein the channeling controller routes the outbound packets.

3. The wireless provisioning device of claim 2, wherein the channeling controller routes the outbound packets.

4. The wireless provisioning device of claim 1, wherein the channeling controller bridges the inbound packets.

5. The wireless provisioning device of claim 4, wherein the channeling controller bridges the outbound packets.

6. The wireless provisioning device of claim 1, wherein the operating system of the wireless provisioning device is an open source UNIX based system.

7. The wireless provisioning device of claim 1, wherein the wireless provisioning device further comprises a second processor.

8. The wireless provisioning device of claim 1, wherein the wireless provisioning device further comprises a memory device and a storage device.

9. The wireless provisioning device of claim 1, wherein the network card, the wireless cord, the processor, the operating system, the packet-switched interface, and the channel controller are operatively disposed within the chassis of the wireless provisioning device.

10. The wireless provision device of claim 9, wherein the authenticator is operatively disposed within the chassis of the wireless provisioning device.

11. The wireless provisioning device of claim 1, wherein bandwidth to individual user can be controlled by the wireless provisioning device operating system.

12. The wireless provisioning device of claim 1, wherein the protocol type of an individual user con be controlled by the wireless provisioning device operating system.

13. A wireless provisioning device, comprising:

a chassis;

at least one network card;

at least one wireless card;

at least one processor;

a LINUX operating system, the operating system operably configured in the chassis to control the at least one network card, the at least one wireless card and the at least one processor;

a packet-switched interface capable of receiving a multiplicity of inbound framed packet-data to provide inbound packets and transmitting a multiplicity of outbound framed packet-data comprising outbound packets;

a channeling controller, coupled to the packet-switched interface that channels the inbound packets based on the inbound address information and that constructs the outbound packets and channels the outbound packets with the outbound address information, the channeling controller capable of being effectively connected to at least one network via the operating system.

14. A system for allowing users to securely access public domain area networks via mobile computing devices, comprising:

a plurality of wireless access points;

at least one wireless provisioning device for receiving, authenticating, transmitting, and directing data over a plurality of networks and capable of sustaining connectivity between the wireless access points and the wireless provisioning device, the wireless provisioning device comprising a chassis, at least one network card, at least one wireless card, at least one processor, and at least one operating system operably configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new rooming member can be added to the system;

a carrier structure communicably positioned between the wireless provisioning device and the plurality of wireless access points for transmitting and receiving data between the wireless provisioning device and the plurality of wireless access points by means of a secure connections; and a security authentication protocol, initiated by the wireless provisioning device, capable of authenticating traffic as it passes through the carrier structure.

15. A system for allowing users to securely access public domain area networks via mobile computing devices, comprising:

a plurality of wireless access points;

at least one wireless provisioning device for receiving, authenticating, transmitting, and directing data over a plurality of networks and capable of sustaining connectivity between the wireless access points and the wireless provisioning device, the wireless provisioning device comprising a chassis, at least one network card, at least one wireless card, at least one processor, and at least one operating system operably configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new rooming member can be added to the system, the wireless provisioning device further comprises a directory services member operatively connected to the operating system thereof, which is suitable for maintaining a database directory that stores MAC addresses and billing profiles for those in the system;

a carrier structure communicably positioned between the wireless provisioning device and the plurality of wireless access points for transmitting and receiving data between the wireless provisioning device and the plurality of wireless access points by means of a secure connections; and a security authentication protocol, initiated by the wireless provisioning device, capable of authenticating traffic as it posses through the carrier structure.

16. The system of claim 15, wherein the wireless provisioning device is capable of bridging.

17. The system of claim 16, wherein the wireless provisioning device is capable of routing.

18. The system of claim 15, wherein the carrier structure is a suitable antenna for providing bridging solutions that afford the user the ability to place wireless equipment in a wide area network.

19. The system of claim 15, wherein the security authentication protocol is a radius authentication protocol.

20. The system of claim 15, wherein the wireless provisioning device provides proxy service.

21. The system of claim 15, wherein the wireless provisioning device provides firewall service.

22. The system of claim 15, wherein the system comprises at least one antenna, a plurality of wireless access points;

at least one wireless provisioning device for receiving, authenticating, transmitting, and directing data over a plurality of networks and capable of sustaining connectivity between the wireless access points and the wireless provisioning device, the wireless provisioning device comprising a chassis, at least one network card, at least one wireless card, at least one processor, and at least one operating system operably configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new roaming member can be added to the system, the wireless provisioning device further comprises a directory services member operatively connected to the operating system thereof, which is suitable for maintaining a database directory that stores MAC addresses and billing profiles for those in the system;

a carrier structure communicably positioned between the wireless provisioning device and the plurality of wireless access points for transmitting and receiving data between the wireless provisioning device and the plurality of wireless access points by means of a secure connections; and a security authentication protocol, initiated by the wireless provisioning device, capable of authenticating traffic as it passes through the carrier structure.

23. The system of claim 22, wherein there is more than one antenna and the user is capable of logging on and sustain connectivity with the system while transitioning antennas.

24. The system of claim 22, wherein the user is capable of logging onto and sustaining connectivity with the system while transitioning access points.

25. The system of claim 15, wherein the operating system of the wireless provisioning device is an open source Unix base system.

26. A system, comprising:

a plurality of wireless access points;

at least one wireless provisioning device for receiving, transmitting, and directing data over a plurality of networks and capable of sustaining connectivity between the wireless access points and the wireless provisioning device, the wireless provisioning device comprising a chassis, at least one network card, at least one wireless card, at least one processor, and at least one operating system operably configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new roaming member can be added to the system, the wireless provisioning device further comprises a directory services member operatively connected to the operating system thereof, which is suitable for maintaining a database directory that stores MAC addresses and billing profiles for those in the system;

a carrier structure communicably positioned between the wireless provisioning device and the plurality of wireless access points for transmitting and receiving data between the wireless provisioning device and the plurality of wireless access points by means of a secure shell telnet connection; and a security authentication protocol capable of authenticating traffic as it passes through the carrier structure.

27. A system for allowing users to securely access public domain area networks via mobile computing devices, comprising:

a plurality of wireless access points;

at least one wireless provisioning device for receiving, authenticating, transmitting, and directing data over a plurality of networks and capable of sustaining connectivity between the wireless access points and the wireless provisioning device, the wireless provisioning device comprising a chassis, at least one network card, at least one wireless card, at least one processor, and at least one operating system operably configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new roaming member can be added to the system;

a 2.4 GHz antenna operatively coupled with the wireless provisioning device;

a carrier structure communicably positioned between the wireless provisioning device and the plurality of wireless access points for transmitting and receiving data between the wireless provisioning device and the plurality of wireless access points by means of a secure connections; and a security authentication protocol, initiated by the wireless provisioning device, capable of authenticating traffic as it posses through the carrier structure.

28. A system, comprising:

a plurality of wireless access points;

at least one wireless provisioning device for receiving, transmitting, and directing data over a plurality of networks and capable of sustaining connectivity between the wireless access points and the wireless provisioning device, the wireless provisioning device comprising a chassis, at least one network card, at least one wireless card, at least one processor, and at least one LINUX operating system operably configured in the chassis and associated with at least one of the plurality of wireless access points for transmitting and receiving data between the wireless access point and a carrier structure and where the wireless provisioning device is capable of accommodating multiple connections back to the wireless access point without requiring rebooting before a new roaming member can be added to the system, the wireless provisioning device further comprises a directory services member operatively connected to the operating system thereof, which is suitable for maintaining a database directory that stores MAC addresses and billing profiles for those in the system;

a carrier structure communicably positioned between the wireless provisioning device and the plurality of wireless access points for transmitting and receiving data between the wireless provisioning device and the plurality of wireless access points by means of a secure connections; and a security authentication protocol capable of authenticating traffic as it passes through the carrier structure.

29. The wireless provisioning device of claim 28, wherein the network card, the wireless card, the processor, the operating system, the packet-switched interface, and the channel controller are operatively disposed within the chassis of the wireless provisioning device.

30. The wireless provision device of claim 29, wherein the authenticator is operatively disposed within the chassis of the wireless provisioning a device.

31. The wireless provisioning device of claim 28, wherein bandwidth to individual user can be controlled by the wireless provisioning device operating system.

32. The wireless provisioning device of claim 28, wherein the protocol type of an individual user can be controlled by the wireless provisioning device operating system.

* * * * *

US007035281C1

(12) INTER PARTES REEXAMINATION CERTIFICATE (659th)
United States Patent
Spearman et al.

(10) Number: US 7,035,281 C1
(45) Certificate Issued: Aug. 7, 2013

(54) WIRELESS PROVISIONING DEVICE

(75) Inventors: Anthony C. Spearman, Lane, SC (US); Andrew E. Tompkins, Summerville, SC (US)

(73) Assignee: Wecom Systems LLC, Roebuck, SC (US)

Reexamination Request:
No. 95/001,089, Oct. 13, 2008

Reexamination Certificate for:
Patent No.: 7,035,281
Issued: Apr. 25, 2006
Appl. No.: 09/660,709
Filed: Sep. 13, 2000

(51) Int. Cl.
*H04J 3/16* (2006.01)
*H04L 12/56* (2011.01)

(52) U.S. Cl.
USPC .......................................... 370/465; 370/401

(58) Field of Classification Search
None
See application file for complete search history.

(56) References Cited

To view the complete listing of prior art documents cited during the proceeding for Reexamination Control Number 95/001,089, please refer to the USPTO's public Patent Application Information Retrieval (PAIR) system under the Display References tab.

*Primary Examiner* — Deandra Hughes

(57) ABSTRACT

A wireless provisioning device (WPD) is a computer data traffic management system capable of routing TCP/IP traffic using 2.4 Ghz equipment. This WPD is to be strategically placed in logical segment regions within a wireless network to facilitate data traffic management. This device acts to provide connectivity between wireless backbone access points. The device may also be located within customer local area network (LAN) while providing connectivity to a wide area network (WAN). The wireless device has seven total wireless segments. The wireless device is capable of filtering IP addresses, controlling firewall and/or router and/or bridge. The wireless provisioning device increases effective throughput of TCP/IP traffic over the WAN or LAN while providing for secure management and greater connectivity.

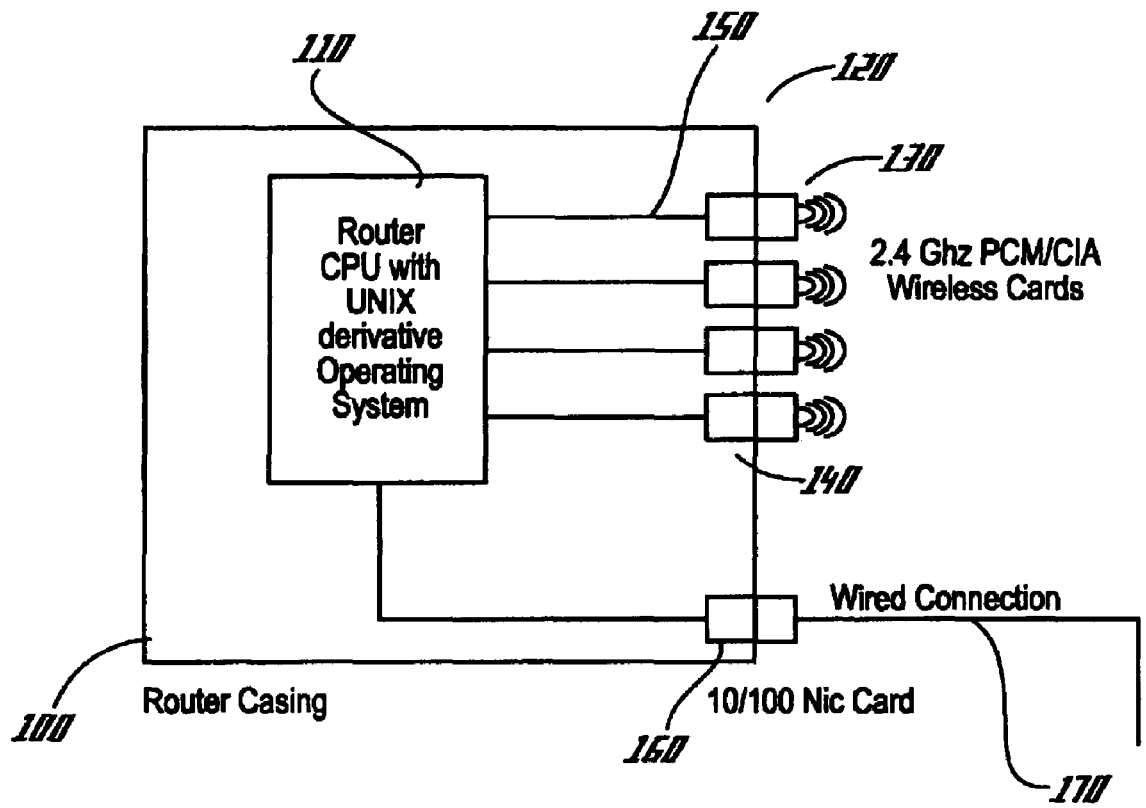

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-3 and 8-10 is confirmed.

Claims 4-7 and 11-32 were not reexamined.

\* \* \* \* \*